(12) United States Patent
Ludwig et al.

(10) Patent No.: US 11,823,261 B2
(45) Date of Patent: Nov. 21, 2023

(54) PROCESS ORCHESTRATION AND DYNAMIC DATA ACQUISITION SYSTEM

(71) Applicant: Bank of America Corporation, Charlotte, NC (US)

(72) Inventors: Moran Ludwig, Dallas, TX (US); Edward G. Connell, West Grove, PA (US); Kanaka Subramaniam Kunjithapatham, Newark, DE (US); Partha Sarathi Dhar, Chester Springs, PA (US); Navneet Tyagi, Gurugram Haryana (IN); Shashank Bajpai, Raebareli Uttar Pradesh (IN); Hirenkumar R. Patel, Newark, DE (US); Daniel Lee Wadsworth, Washington, DC (US); Amanda Jines, Chandler, AZ (US); Alexander W. Flynn, Phoenix, AZ (US); Venugopal Ramini, Hyderabad Telangana (IN)

(73) Assignee: Bank of America Corporation, Charlotte, NC (US)

( * ) Notice: Subject to any disclaimer, the term of this patent is extended or adjusted under 35 U.S.C. 154(b) by 24 days.

(21) Appl. No.: 17/547,552

(22) Filed: Dec. 10, 2021

(65) Prior Publication Data
US 2023/0186383 A1  Jun. 15, 2023

(51) Int. Cl.
*G06Q 40/03* (2023.01)
(52) U.S. Cl.
CPC .................. *G06Q 40/03* (2023.01)

(58) Field of Classification Search
CPC ................................. G06Q 40/025
See application file for complete search history.

(56) References Cited

U.S. PATENT DOCUMENTS

| | | |
|---|---|---|
| 7,412,399 B1 | 8/2008 | Racca et al. |
| 7,680,752 B1 | 3/2010 | Clune, III et al. |
| 8,141,125 B2 | 3/2012 | Maes |
| 8,271,609 B2 | 9/2012 | Addala et al. |
| 8,402,064 B2 | 3/2013 | Addala et al. |
| 8,458,312 B2 | 6/2013 | Raghunathan et al. |
| 8,627,271 B2 | 1/2014 | Reed et al. |
| 9,658,901 B2 | 5/2017 | Addala et al. |
| 10,171,315 B2 | 1/2019 | Arnold et al. |
| 2005/0108123 A1* | 5/2005 | Schneider .............. G06Q 20/10 705/38 |

(Continued)

*Primary Examiner* — Bennett M Sigmond
*Assistant Examiner* — Marla Hudson
(74) *Attorney, Agent, or Firm* — Banner & Witcoff, Ltd.

(57) ABSTRACT

A process orchestration and dynamic data acquisition system may allow process flows to be flexible and to customer or product requirements based on rules obtained from a rule management system. The process orchestrator may be driven based on an updatable and dynamic set of business rules to allow for quick changes to the process flow. Through the business rules the process orchestrator retrieves and processes data necessary to the process based on a customer request and/or product or service provided. The process orchestrator provides dynamic data aggregation from both internal and external data sources, through calling re-useable processes instantiated by the process host system and continuously adapts the process flow to meet the unique needs of each request input and results returned from each dynamic process call.

20 Claims, 7 Drawing Sheets

(56) References Cited

U.S. PATENT DOCUMENTS

2008/0021820 A1\* 1/2008 Brake .................. G06Q 20/357
705/39
2010/0121740 A1 5/2010 Reed et al.

\* cited by examiner

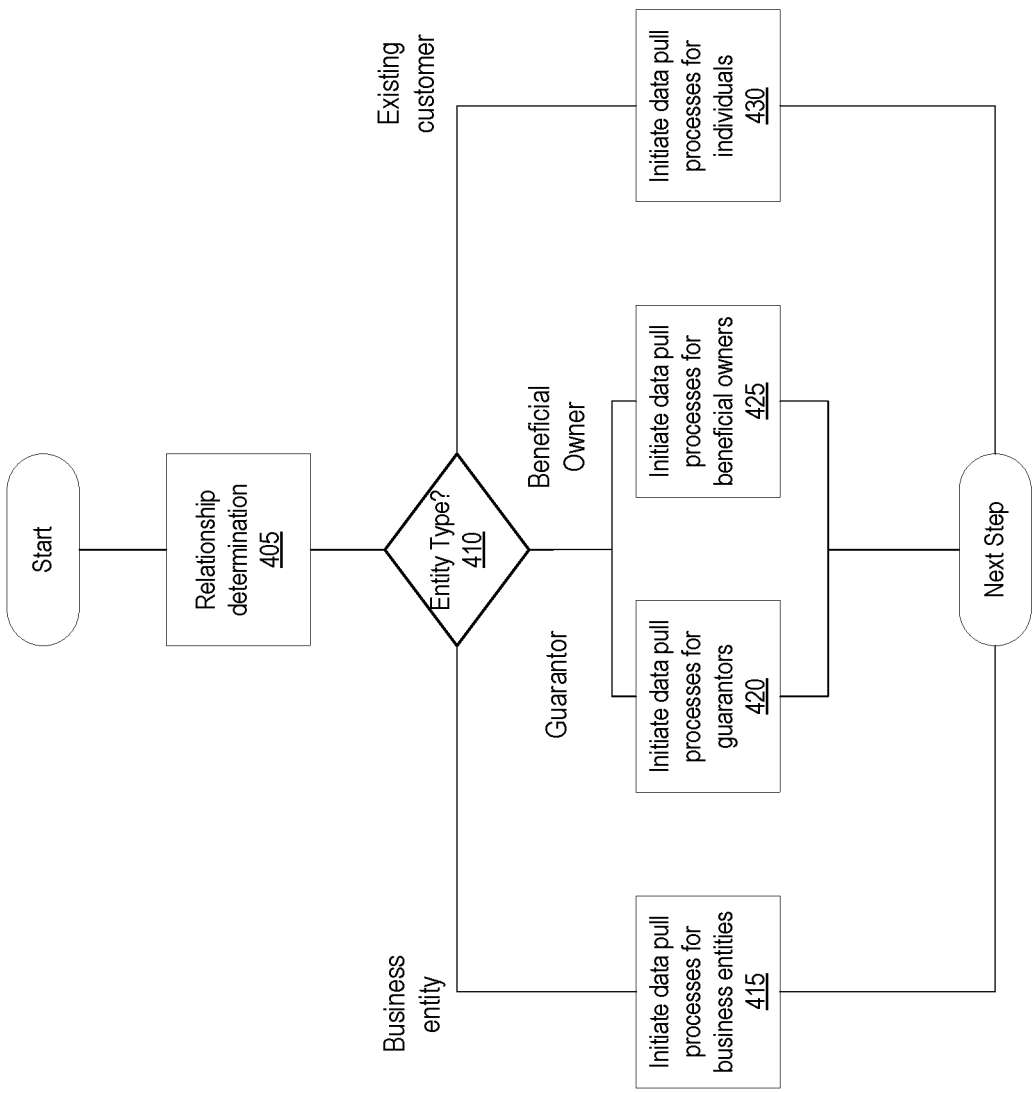

PROCESS ORCHESTRATION AND DYNAMIC DATA ACQUISITION SYSTEM

BACKGROUND

Enterprise organizations may utilize computerized processes for information processing when making business decisions. Often, the computerized processes are based on a static model that is fixed based on a predetermined methodology. However, fixed process flows may not fully reflect the changes to business rules and processes based on market conditions. Such inability to adapt automated processes may result in higher costs, increased time to market, inefficient use of computer-based resources and/or inconsistent customer treatment. These problems may reflect inefficiencies in aggregating data that is meaningful to the changed business processes that would, if efficiently aggregated, quickly and directly assist in performing automated business tasks. Additionally, status process flows may be performed in a step-wise manner, such that all steps must always be performed, even when not required in particular situations. Modification of the static processes are time consuming, prone to errors, and/or may be expensive to implement due to increased development time and/or computer processing requirements.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure provide solutions that address and overcome technical problems associated with automating processes based on customer input and dynamically retrieved information. In particular, one or more aspects of the disclosure relate to use of a library of automated processes that may be dynamically scheduled to retrieve local and/or from remote data sources, and analyzed to modify an order of call of the processes to complete a received request.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes automating processes based on customer input and dynamically retrieved data.

A process orchestration and dynamic data acquisition system may allow process flows to be flexible and to customer or product requirements. The orchestrator may be driven based on an updatable and dynamic set of business rules to allow for quick changes to the process flow. By utilizing instances of reusable processes, the orchestrator allows for reduced involvement by programmers to maintain or change existing processes as the rules change. Such a streamlined implementation leverages only data necessary to the process based on a customer request and/or product or service provided. Unique aspects of the process orchestrator include dynamic data aggregation from both internal and external data sources, a highly re-useable process flow, and an ability to consistently and/or continuously alter the process flow to meet the unique needs of each customer and/or requirements for each product or service provided by the enterprise user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A-4C show illustrative processes called by the dynamic process orchestration system in accordance with one or more aspects described herein, in accordance with one or more aspects described herein.

DETAILED DESCRIPTION

Figure 1A:
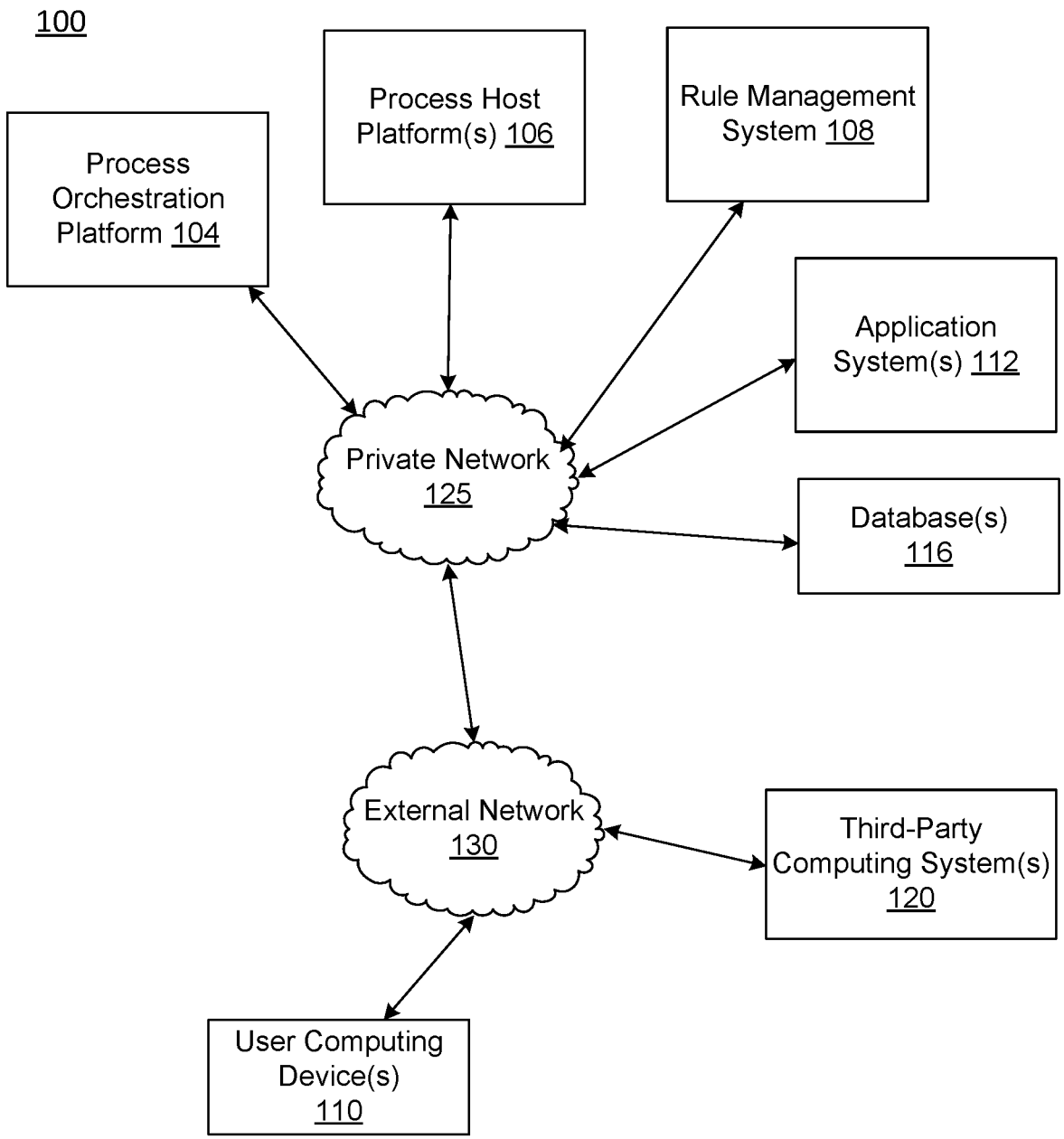
FIG. 1A shows an illustrative computing environment providing automating processes, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

Enterprise organizations, such as financial institutions, provide computing functionality online as products or services. In some cases, as part of the products and services, automated processing of business decisions (e.g., lending decisioning, and the like) may be based on a static model or process flow (e.g., a static underwriting process flow) that do not fully reflect the constant changes required based on evolving business and/or market conditions. This lack of flexibility leads to higher development costs (e.g., developer time, redundant development projects, increased hardware costs, and the like), an increase in time to market, and inconsistent processing of customer requests causing erosion of consumer sentiment. Problems with the static models or process flow may include difficulty in aggregating meaningful information from diverse internal and/or external data sources that may quickly and/or directly affect a decisioning process (e.g., a decision process for consumer loan products). Additionally, static process flows may be similar to an assembly line process, such that certain steps of the process may be required to complete, even if a particular step is not directly useful for a particular input set without extensive reworking of a computerized process, causing delay and increasing development costs.

Many current computerized processes use a static process flow, where data gathering, decision processing, and resulting triggered actions may be hard coded and difficult, if not impossible, to easily modify. As such, customization of a static process flow for specific customers, products, and/or services is expensive and time consuming. Further, while functionality may be useful in other processes, the static nature of these implementations, the functionality as implemented is not re-useable across processes without large amount of programming changes and may require technical involvement to ensure the processes are maintained and/or as the processes change over time. Additionally, overhead and data requirements are high, since the same process in required to be performed in all cases, without consideration to each unique input set.

A process orchestration and dynamic data acquisition system may allow process flows to be flexible and to customer or product requirements. The orchestrator may be driven based on an updatable and dynamic set of business rules to allow for quick changes to the process flow. By utilizing instances of reusable processes, the orchestrator allows for reduced involvement by programmers to maintain or change existing processes as the rules change. Such a streamlined implementation leverages only data necessary to the process based on a customer request and/or product or service provided. Unique aspects of the process orchestrator include dynamic data aggregation from both internal and external data sources, a highly re-useable process flow, and an ability to consistently and/or continuously alter the process flow to meet the unique needs of each customer and/or requirements for each product or service provided by the enterprise user.

FIG. 1A shows an illustrative computing environment 100 configured for automating processes and dynamic data acquisition. The computing environment 100 may comprise one or more devices (e.g., computer systems, communication devices, and the like). The computing environment 100 may comprise, for example, a process orchestration platform 104, one or more process host platform(s) 106, a rule management system 108, one or more application systems 112, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise one or more third party computing systems 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the rule management system 108 as being associated with the enterprise organization and connected to the private network 125, in other examples, the user authentication system 108 may be integrated into the process orchestration platform 104 and/or may be integrated into one or more enterprise organization computing systems, such as the application systems 112.

The process organization platform 104 may comprise one or more computing devices and/or other computer components (e.g., processors, memories, communication interfaces) configured to perform one or more functions as described herein. Further details associated with the architecture of the process orchestration platform 104 are described with reference to FIG. 1B.

The process host platforms 106 may comprise one or more computing devices and/or other computer components (e.g., processors, memories, communication interfaces). In addition, the process host platforms 106 may be configured to host, execute, and/or otherwise provide one or more instances of reusable computerized processes. For example, the computerized processes may be configured to perform data gathering tasks from local databases, such as the databases 116, from one or more application systems 112, and/or, via the external network 130, from the one or more third party computing systems 120. In some cases the processes may be generalized computing processes which may be configured when a process instance is launched. The processes may return data requested when successful and may provide an error indication, such as a flag, an error code, and other error-related information.

The application systems 112 may comprise one or more computing devices and/or other computer components (e.g., processors, memories, communication interfaces). In addition, the application systems may be configured to host, execute, and/or otherwise provide one or more enterprise applications. In an arrangement where the private network 125 is associated with a financial institution (e.g., a bank), the application systems may be configured, for example, to host, execute, and/or otherwise provide one or more loan processing programs, transaction processing programs, such as an online banking application, fund transfer applications, and/or other programs associated with the financial institution. The application system 112 may comprise various servers and/or databases that store and/or otherwise maintain account information, such as financial account information including account balances, transaction history, account owner information, and/or other information. In addition, the application systems 112 may process and/or otherwise execute transactions on specific accounts based on commands and/or other information received from other computer systems comprising the computing environment 100. In some cases, the application systems 112 may be configured, for example, to host, execute, and/or otherwise provide one or more transaction processing programs, such as electronic fund transfer applications, online loan processing applications, and/or other programs associated with the financial institution.

The rule management system 108 may be a host device (e.g., a workstation, a server, and the like) or mobile computing device (e.g., smartphone, tablet). In addition, an administrative computing device may be linked to and/or operated by a specific enterprise user (who may, for example, be an employee or other affiliate of the enterprise organization) who may have supervisory or administrative privileges to perform various operations within the private network 125, such as defining business rules to be followed by the process orchestration platform 104 when determining a process orchestration process. In some cases, the rule management system 108 may include a user authentication system that may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for viewing rules and/or processes and a second level of user identification may be used to enable certain activities and/or activate certain access rights that allow for rule creation and/or editing.

A third party computing system of the third party computing systems 120 may comprise one or more computing devices and/or other computer components (e.g., processors, memories, communication interfaces). The third-party computing system 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the third-party computing system 120 is for processing an electronic exchange of goods and/or services. The third-party computing system 120 may be associated with a specific goods purchasing activity, such as purchasing a vehicle, transferring title of real estate may perform communicate with one or more other platforms within the third-party computing system 120.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the process orchestration platform 104. For example, the database(s) 116 may store user information that may be potentially associated with, for example, a loan application process. In an arrangement, the database(s) 116 may be used for other purposes as described herein.

In one or more arrangements, the process orchestration platform 104, the one or more process host platform(s) 106, the rule management system 108, the one or more application systems 112, the database(s) 116, the third-party computing system 120, the user devices 110, and/or the other devices/systems in the computing environment 100 may be any type of computing device capable of receiving input via a user interface, and communicating the received input to one or more other computing devices in the computing environment 100. For example, the process orchestration platform 104, the one or more process host platform(s) 106, the rule management system 108, the one or more application systems 112, the database(s) 116, the third-party computing system 120, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the process orchestration platform 104, the one or more process host platform(s) 106, the rule management system 108, the one or more application systems 112, the database(s) 116, the third-party computing system 120, the user devices 110, and/or the other devices/systems in the computing environment 100 may, in some instances, be and/or comprise special-purpose computing devices configured to perform specific functions.

Figure 1B:
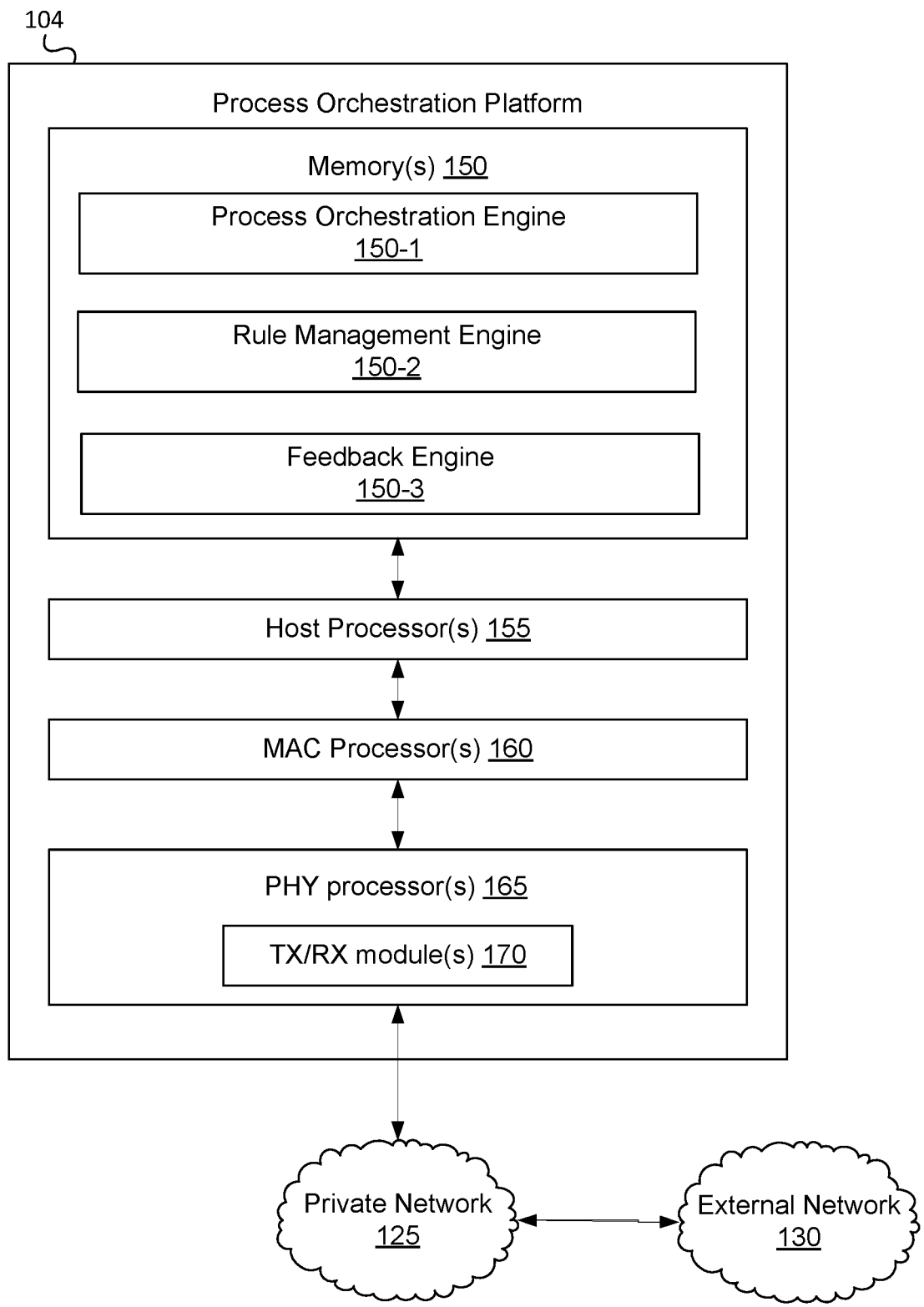
FIG. 1B shows an illustrative computing platform enabled for automating processes, in accordance with one or more aspects described herein.

FIG. 1B shows an example of a process orchestration platform 104 in accordance with one or more examples described herein. The process orchestration platform 104 may comprise one or more of host processor(s) 155, medium access control (MAC) processor(s) 160, physical layer (PHY) processor(s) 165, transmit/receive (Tx/Rx) module(s) 170, memory 150, and/or the like. One or more data buses may interconnect host processor(s) 155, MAC processor(s) 160, PHY processor(s) 165, and/or Tx/Rx module(s) 170, and/or memory 150. The process orchestration platform 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. Memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the process orchestration platform 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the Tx/Rx module(s) 170 over the private network 155. Similarly, the PHY processor(s) 165 may receive PHY data units from the Tx/Rx module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the process orchestration platform 104 may be configured to execute machine readable instructions stored in memory 150. The memory 150 may comprise (i) one or more program modules/engines having instructions that when executed by the one or more processors cause the check generation service platform 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the process orchestration platform 104 and/or by different computing devices that may form and/or otherwise make up the process orchestration platform 104. For example, the memory 150 may have, store, and/or comprise a process orchestration engine 150-1, a rule management engine 150-2, and/or a feedback engine 150-3. The process orchestration 150-1 may have instructions that direct and/or cause the process orchestration platform 104 to perform one or more operations associated with processing input received from a user to dynamically call processes to complete a requested action, where the process orchestration engine dynamically analyzes retrieved data to identify a next action and to call a next process to perform the identified action. The rule management engine 150-2 may have instructions that may cause the process orchestration platform 104 to retrieve a set of rules for processing the input based on the identified action and to provide the rules to the process orchestration engine 150-1 for processing. The feedback engine 150-3 analyze results of the process when complete and provide feedback of a success or failure of the process to the process orchestration engine to improve a next dynamic operation of similar received input and/or, in case of a failure, may communicate an indication of rules that resulted in an error condition for particular inputs via the one or more network 125, 130 such as to a rule management system 108 and/or the user devices 110.

While FIG. 1A illustrates the process orchestration platform 104, the process host platform 106, and/or the rule management system 108, as being separate elements connected in the private network 125, in one or more other arrangements, functions of one or more of the above may be integrated in a single device/network of devices. For example, elements in the process orchestration platform 104 (e.g., host processor(s) 155, memory(s) 150, MAC processor(s) 160, PHY processor(s) 165, Tx/Rx module(s) 170, and/or one or more program/modules stored in memory(s) 150) may share hardware and software elements with and corresponding to, for example, the process host platform 106, and/or the rule management system 108.

Figure 2:
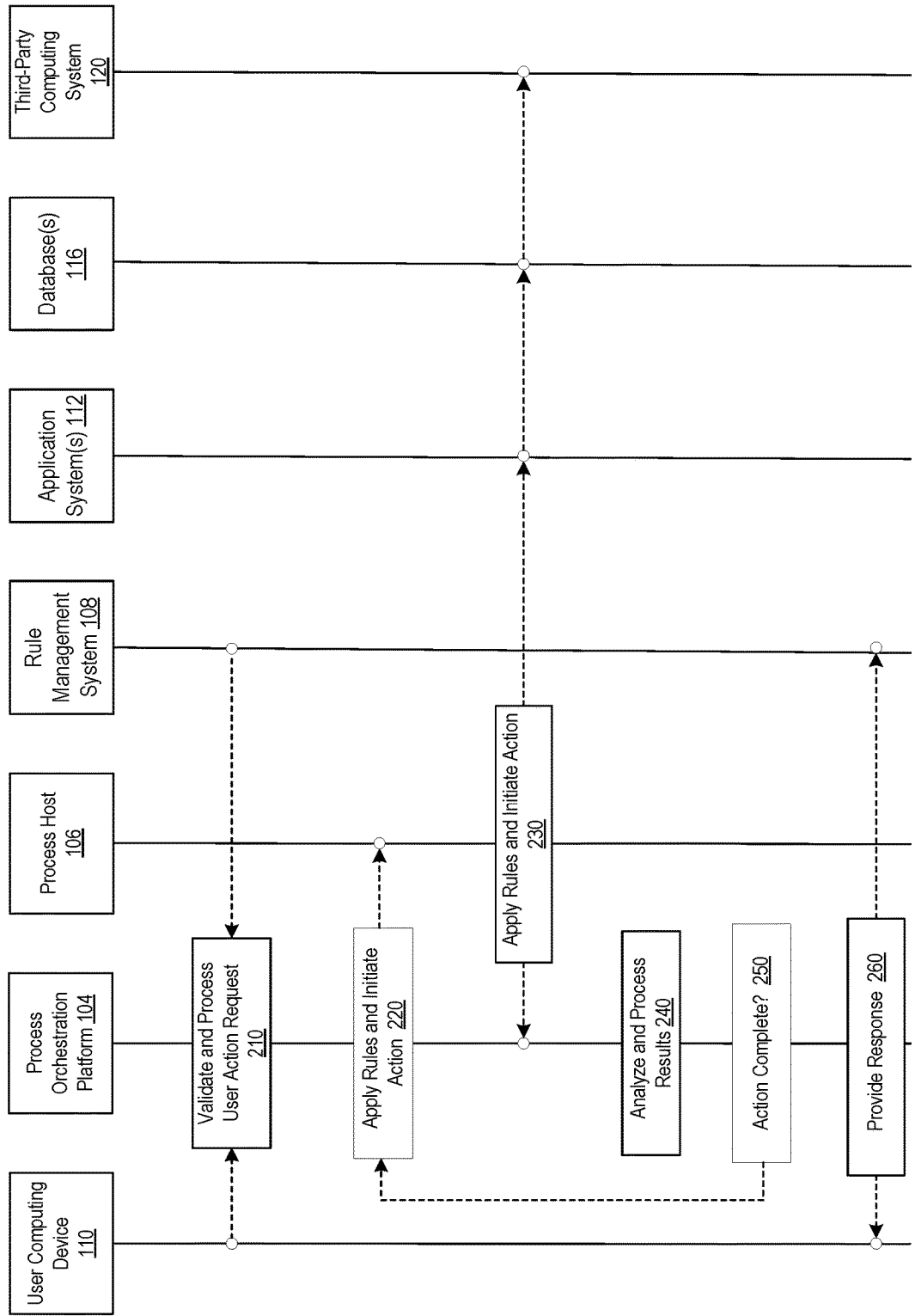
FIG. 2 shows an illustrative event sequence for process orchestration of automated processes, in accordance with one or more aspects described herein.

FIG. 2 shows an illustrative event sequence for orchestration of processes based on dynamic data acquisition, in accordance with one or more illustrative arrangements. The user computing device 110 may be used to initiate a requested action (e.g., submit, request for a financial product such as a consumer or commercial loan via a mobile application, a web interface and the like). In some cases, the requested action may be initiated in preparation of or in a process of a transaction for a product or service. For example, the transaction may correspond to a purchase involving a substantial amount of money for a vehicle, real estate, or the like. FIG. 2 shows an illustrative example of an automated process based on dynamically retrieved data. At 210, a user of the user device 110 may initiate a request a product or service to be provided by an enterprise organization, such as via a mobile application, where the process orchestration platform 104 may receive and validate the user input based on rules retrieved from the rule management system 108. For example, a user interface may include fields for entry of a user identification information, an action request (e.g., a personal loan, a consumer loan), and other required data based on the action request. In some cases, the request to initiate the process orchestration system 104, based on an input received, may initiate an access of a user interface screen to generate a request for the user to enter request information, and/or prompt for a selection of an input on the user interface screen based on input received.

At 220, the process orchestration platform 104 may apply rules to the user input and initiate a first action, such as by calling an instance of a process by the process host platform 106. Rules may be provided from the rule management system 108 via a network or, in some cases, the rule management system 108 may be integrated into at least a portion of the process orchestration platform 104. The rule management system 108 may include a data store storing rules to guide performance of a product or service provided by the enterprise organization, such as providing a consumer or business loan. Such rules may be defined and encoded into instructions that allow the process orchestration platform 104 to orchestrate performance of the service to be provided. In the past, such rules may have been hard coded into a service process and integrated into one or more computing systems to perform the service. Over time, the service processes may be expanded to encompass all conceivably possible operations necessary to account for each user's request. As mentioned such code may cause unnecessary actions to be performed causing an excessive drain on computing power and may be difficult to update as changes are needed. Here, each service may be broken down into multiple processes to be performed, which may be re-used in other processes when the same, or similar information or analysis is required. For example, data gathering from internal and/or external sources may be automated into stand alone processes to be performed, An illustrative example of which is provided with reference to FIG. 3, discussed below in further detail. Operation of each individual process may be managed, or hosted, by the process host 106, where calls to initiate execution of instances of each process may be managed by the process orchestration platform 104 based on the rules received from the rule management system. In some cases, as part of the process orchestration process, the process orchestration platform 104 may analyze results of each process called and may automatically save a record of the success or failure or the process to provide a dynamic continuous improvement to the rules. For example, if a process succeeds based on a given set of input, the process orchestration platform 104 may group a set of processes together to be instantiated as a group to improve speed of performance of future input data sets that are similar to those that completed successfully. In some cases, the process orchestration platform may communicate the success or failure of each process, or group of processes, along with any returned error messages, to the rule management system 108 for inclusion in a troubleshooting data store for future analysis. In some cases, the rule management system 108 may include an automated machine learning engine to autonomously update and/or improve the rule set, or analyze a predicted success or failure of new rules added to the rule data set, based on feedback from the dynamic process orchestration of the same or similar processes.

Returning to step 210, in an illustrative example, the process orchestration platform 104 may identify a particular action is to be initiated based on a user input having a particular value (e.g., a process to receive data from an internal database 116), as shown in FIG. 4A. For example, analysis of the user input by the process orchestration platform 104, at 405, may call a relationship determination process to be initiated by the process host. At 410, the process host may return an entity type that may be associated with the user, such as an application for a consumer loan. The may identify a user to requesting a consumer loan is an existing customer, so that a process is called to pull information from an internal database 116. If the user is identified as a business, the process orchestration engine 104 may initiate a different process to be instantiated by the process host platform 106 to pull data from one or more of a service application of the application systems 112 provided by the enterprise organization and/or from a third-party computing system 120. At 415, if the identified entity type is determined to be a business entity, the process orchestration platform 104 may instantiate multiple processes to pull information from multiple data sources, both internal and/or external to the enterprise organization. At 420, if the identified entity type is determined to be a guarantor, the process orchestration platform 104 may instantiate multiple processes to pull information from multiple data sources, both internal and/or external to the enterprise organization, where the processes called may be different than those processes pulling information for a business entity. At 425, if the identified entity type is determined to be a beneficial owner, the process orchestration platform 104 may initiate a single data request process to be performed to request data from a particular data source, where the data source may be external to the enterprise organization or internal to the enterprise organization. At 430, if the identified entity type is determined to be an existing customer of the enterprise organization, required data may be already available internal to the enterprise organization computing system. As such, the process orchestration platform may initiate a process request of the process host platform 106 to enable operation of a process to retrieve data internal to the enterprise organization system. Because all user requests are different, based on the unique data set of each requestor, the process orchestration platform may be able to adapt and dynamically adjust the process to only call processes to pull data relevant to the particular request, thereby improving the efficiency of the overall computing system.

Figure 4B:
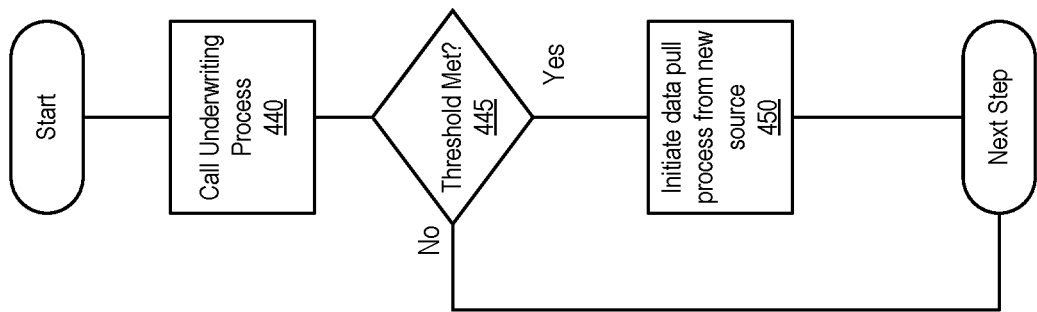
Figure 4C:
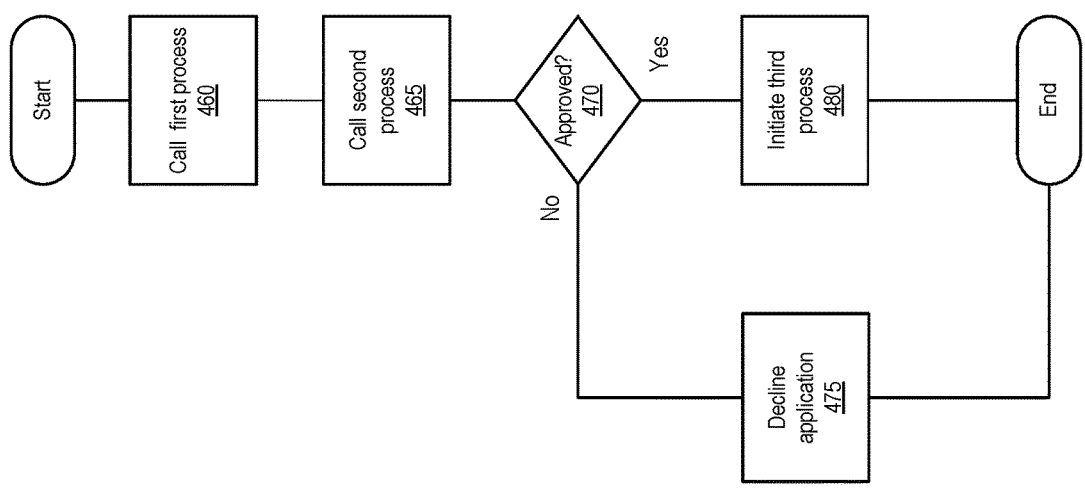

FIGS. 4B and 4C illustrate similar efficiencies provided by the process orchestration process performed by the process orchestration platform 104. For example, FIG. 4B illustrates a dynamically orchestrated portion of a loan application process. Here, an underwriting process may be initiated by the process host platform 106 in response to a request by the process orchestration platform 104. As part of the process, at 440, the underwriting process may also call another process to pull data from one or more external data sources, such as an automated request to one or more credit reporting agencies for a credit rating associated with the applicant. This result, among other results, may be returned to the process orchestration platform 104 for further analysis with respect to the rules. Here if at 445, a threshold condition is met, the process orchestration platform 104 may initiate a call to perform another process by the process host platform 106 at 450, such as a data request to an external computing network providing an additional functional service (e.g., a clearinghouse service providing risk management functionality). If, at 445, the threshold is not met, the additional delays of requesting unneeded data from an external data source may be avoided and the process orchestration platform 104 proceeds to the next step in the application process.

FIG. 4C shows additional dynamic functionality that may be performed by the process orchestration platform 104 based on rules provided to perform a particular service. Here, at 460, the process orchestration platform may perform actions based on rules associated with fraud prevention strategies. Here, the rules may cause the process orchestration platform 104 to initiate fraud prevention processes when applications are flagged for approval. For example, at 410, the process orchestration platform 104 may call a first process or processes to be performed by the process host platform 106 such as to complete an initial evaluation of an application, of which processes shown in FIGS. 4A and 4B may be a part. At 420, a second process may be called upon a successful completion of the processes indicating passing of the initial evaluation process(es). For example, the process orchestration host may initiate operation of an underwriting process by the process host platform 106. Upon completion of the second process, approval of the application may be ascertained at 470. If at 470, the application is declined, the process orchestration platform 104 initiates an action of a process at 475 to decline the instant application. If, at 470, the application is approved, the process orchestration platform 104 may initiate a third process at 480 to perform an additional action or actions, such as calling processes to request additional data and/or to initiate one or more processes by the process host platform 106 to perform fraud identification processes.

Returning to FIG. 2, at 230, the process host platform 106 initiates the requested process to interact with one or more of the application systems, the databases 116, or the third-party computing system 120 to dynamically retrieve the data. At 240, the process orchestration platform 104 analyzes the data returned from the process to determine whether the process completed successfully. In some cases, if an error response is received, the process orchestration platform 104 may end the action and return an error to the requesting user computing device 110. If the process completed successfully, the process orchestration engine may analyze the data returned from the process based on the rules to identify whether a last process call has been made at 240. If not, a next step is performed at 220 and the process orchestration platform 104 continues to apply rules to continue performance of the requested service. If, at 250, the action is complete, the process orchestration 104 may provide a response to the user computing device 110 (e.g., cause a window or other visual output to appear on the user computing device 110) about the success or failure of the user request. Feedback may be provided to the rules management system 108 regarding the success or failure of the business rules. The rules management system 108 may automatically adjust a business rule based on the feedback received and/or may generate a message to a rule management user interface to provide notice to a responsible user.

Figure 3:
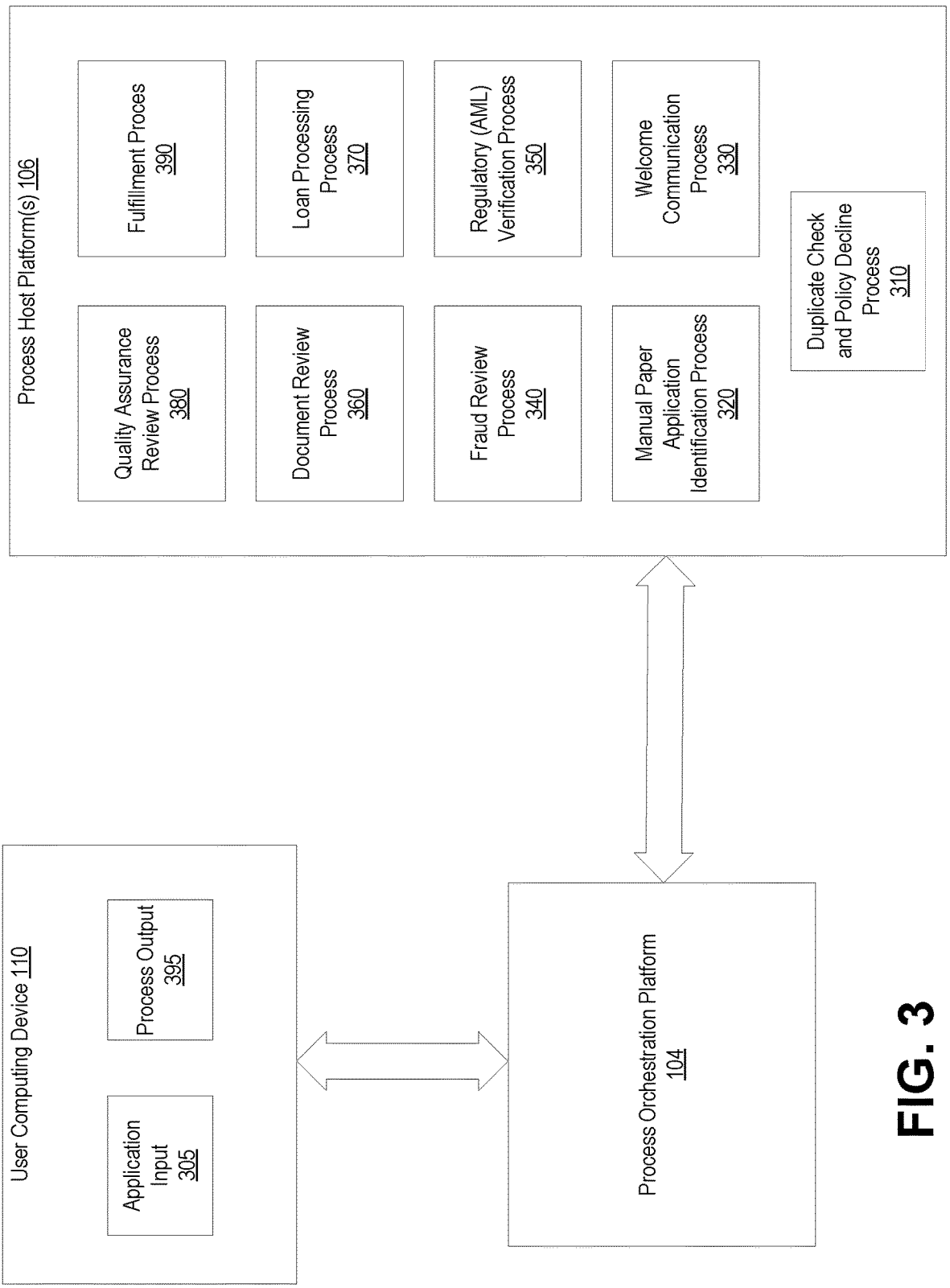
FIG. 3 shows an illustrative block diagram of a computing system providing an automated dynamic process orchestration system, in accordance with one or more aspects described herein.

FIG. 3 shows an illustrative block diagram of a computing system providing an automated dynamic process orchestration system, in accordance with one or more aspects described herein. For example, a user computing device 110 may provide user interface to allow a user to input information and trigger a request via an application input 305, such as by filling out a form or forms and clicking a submit button on the user interface. The application input 305 may cause the process orchestration platform 104 to evaluate the application input 305 to identify a service associated with the received request, such as a loan application service or the like. Once identified, the process orchestration platform 104 may identify rules associated with the requested service, or pull the rules from the rule management system 108, in whole or in part. As part of an illustrative loan application process, the process orchestration platform 104 may initiate, as necessary, one or more of a plurality of processes to be performed as part of the application service request by the process host platform 106 including, but not limited to, a duplicate check and policy decline process 310, a manual paper application identification process 320, a welcome communication process 330, a fraud review process 340, one or more required regulatory processes 350, a document review process 360, a loan processing process 370, a quality assurance review process 380, a fulfillment process 390, and/or the like. Additionally, each process of the process 310-390 may include additional processes (e.g., data gathering processes, data verification processes, and the like) that may be performed based on additional rules processed by the process orchestration platform 104 as needed based on the particular application process, the requesting user's information, and/or results returned from each process called during performance of the particular requested service. Upon conclusion of the requested service, or individual process, the process orchestration platform may cause an output to be displayed via a process output visualization 395 at the user computing device. The process output visualization 395 may provide an indication of process errors (e.g., incomplete or inaccurate data, and the like), process failures (e.g., a failure to pass a fraud review process, and the like), requests for additional information, and/or a success or failure of the request (e.g., an application approval and link to next steps in the requested service, a rejection of the application, and the like).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system comprising:
a user computing device presenting, via a display, a user interface screen comprising an input that triggers a request for a product or service;

a process orchestration platform communicatively coupled to the user computing device, comprising:
  at least one processor; and
  memory storing computer-readable instructions that, when executed by the at least one processor, cause the process orchestration platform to:
    initiate, based on the input and received from the user computing device via a network, a dynamic process sequence associated with an automated product or service to be provided;
    identify, based on information received with the input and from the user computing device, a first process of the dynamic process sequence;
    initiate, at a process host platform, an instance of the first process;
    repeatedly initiate, automatically by the process host platform and based on dynamically acquired data from a previous process, a next process of the dynamic process sequence, wherein the next process of the dynamic process sequence is identified via analysis of the dynamically acquired data from the previous process;
    generate, on the display of the user computing device and based on an indication that a last process has completed, an indication of a result of the dynamic process sequence and the received request;
    group, based on an indication of successful completion of the dynamic process sequence and a first set of input, a set of processes together to be instantiated as a dynamic process group in response to future input data sets that are similar to those that completed successfully; and
    initiate, based on receipt of second information corresponding to the first set of input, the dynamic process group.

2. The system of claim 1, wherein the instructions cause the process orchestration platform to receive a request to initiate an automated application for a loan.

3. The system of claim 2, wherein the loan comprises a consumer loan or a small business loan.

4. The system of claim 1, wherein the first process pulls data from an internal database.

5. The system of claim 1, wherein the instructions cause the process orchestration platform to initiate a process to pull data from a third-party computing system.

6. The system of claim 1, wherein identification of the first process of a dynamic process sequence is based on rules provided by an owner of the process.

7. The system of claim 6, wherein the instructions further cause the process orchestration platform to identify a next process of the dynamic process sequence based on output returned from operation of the previous process.

8. A method comprising:
  initiating, based on an input and received from a user computing device via a network, a dynamic process sequence associated with an automated product or service to be provided;
  identifying, by a process orchestration platform and based on information received with the input and from the user computing device, a first process of the dynamic process sequence;
  initiating, at a process host platform, an instance of the first process;
  repeatedly initiating, automatically by the process host platform and based on dynamically acquired data from a previous process, a next process of the dynamic process sequence, wherein the next process of the dynamic process sequence is identified via analysis of the dynamically acquired data from the previous process;
  generating, on a display of the user computing device and based on an indication that a last process has completed, an indication of a result of the dynamic process sequence and the received request;
  grouping, based on an indication of successful completion of the dynamic process sequence and a first set of input, a set of processes together to be instantiated as a dynamic process group in response to future input data sets that are similar to those that completed successfully; and
  initiating, based on receipt of second information corresponding to the first set of input, the dynamic process group.

9. The method of claim 8, comprising receiving, from the user computing device, a request to initiate an automated application for a loan.

10. The method of claim 9, wherein the loan comprises a consumer loan or a small business loan.

11. The method of claim 8, wherein the first process pulls data from an internal database.

12. The method of claim 8, further comprising initiating, by the process orchestration platform, a data pull process to pull data from a third-party computing system.

13. The method of claim 8, wherein identification of the first process of a dynamic process sequence is based on rules provided by an owner of the process.

14. The method of claim 13, further comprising identifying, by the process orchestration platform, a next process of the dynamic process sequence based on output returned from operation of the previous process.

15. Computer readable media storing instructions that, when executed by a computing device, cause the computing device to:
  initiate, based on an input and received from a user computing device via a network, a dynamic process sequence associated with an automated product or service to be provided;
  identify, based on information received with the input and from the user computing device, a first process of the dynamic process sequence;
  initiate, at a process host platform, an instance of the first process;
  repeatedly initiate, automatically by the process host platform and based on dynamically acquired data from a previous process, a next process of the dynamic process sequence, wherein the next process of the dynamic process sequence is identified via analysis of the dynamically acquired data from the previous process;
  generate, on a display of the user computing device and based on an indication that a last process has completed, an indication of a result of the dynamic process sequence and the received request;
  group, based on an indication of successful completion of the dynamic process sequence and a first set of input, a set of processes together to be instantiated as a dynamic process group in response to future input data sets that are similar to those that completed successfully; and
  initiate, based on receipt of second information corresponding to the first set of input, the dynamic process group.

16. The computer readable media of claim 15, wherein the instructions cause the computing device to receive a request to initiate an automated application for a loan.

17. The computer readable media of claim 16, wherein the loan comprises a consumer loan or a small business loan.

18. The computer readable media of claim 17, wherein the first process pulls data from an internal database.

19. The computer readable media of claim 17, wherein the instructions cause the computing device to initiate a process to pull data from a third-party computing system.

20. The computer readable media of claim 17, wherein identification of the first process of a dynamic process sequence is based on rules provided by an owner of the process.

* * * * *